United States Patent
Khare et al.

(10) Patent No.: US 10,430,897 B2
(45) Date of Patent: Oct. 1, 2019

(54) AUTOMATED RIG ACTIVITY REPORT GENERATION

(71) Applicant: Schlumberger Technology Corporation, Sugar Land, TX (US)

(72) Inventors: Sunil Kumar Khare, Allahabad (IN); Chunling Gu Coffman, Houston, TX (US); John Christian Luppens, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 544 days.

(21) Appl. No.: 14/765,342

(22) PCT Filed: Mar. 19, 2014

(86) PCT No.: PCT/US2014/031152
§ 371 (c)(1),
(2) Date: Aug. 2, 2015

(87) PCT Pub. No.: WO2014/160561
PCT Pub. Date: Oct. 2, 2014

(65) Prior Publication Data
US 2015/0371344 A1 Dec. 24, 2015

Related U.S. Application Data

(60) Provisional application No. 61/806,352, filed on Mar. 28, 2013.

(51) Int. Cl.
*E21B 3/00* (2006.01)
*E21B 45/00* (2006.01)
(Continued)

(52) U.S. Cl.
CPC ............. *G06Q 50/02* (2013.01); *E21B 3/00* (2013.01); *E21B 3/02* (2013.01); *E21B 3/04* (2013.01);
(Continued)

(58) Field of Classification Search
CPC ..... E21B 3/00; E21B 3/02; E21B 3/04; E21B 21/08; E21B 45/00; E21B 47/00; G06Q 50/02; G06Q 10/10
See application file for complete search history.

(56) References Cited

U.S. PATENT DOCUMENTS 7,128,167 B2 * 10/2006 Dunlop ................... E21B 44/00
                                                         175/24
7,640,496 B1    12/2009 Chaulk et al.
(Continued)

OTHER PUBLICATIONS

Eric van Oort, Taylor Ed, Thonhauser and Mailda Eric (2008): Real Time rig activity detection helps identify and minimize invisible lost time. World Oil vol. 229 No. 4.
(Continued)

*Primary Examiner* — Matthew R Buck
(74) *Attorney, Agent, or Firm* — Alec J. McGinn

(57) ABSTRACT

A method for automatically generating a drilling rig activity report while operating the rig includes receiving sensor measurements from a plurality of surface sensors deployed on the drilling rig. The sensor measurements may be made in real time while operating the rig and may be processed to compute rig state/activity information. The rig state(s) and a user defined report configuration may then be further processed to automatically generate the rig activity report.

11 Claims, 2 Drawing Sheets

(51) Int. Cl.
*E21B 47/00* (2012.01)
*G06Q 50/02* (2012.01)
*E21B 3/02* (2006.01)
*E21B 3/04* (2006.01)
*E21B 21/08* (2006.01)
*G06Q 10/10* (2012.01)

(52) U.S. Cl.
CPC .............. *E21B 21/08* (2013.01); *E21B 45/00* (2013.01); *E21B 47/00* (2013.01); *G06Q 10/10* (2013.01)

(56) References Cited

U.S. PATENT DOCUMENTS

| | | | | |
|---|---|---|---|---|
| 8,215,417 | B2* | 7/2012 | Annaiyappa | E21B 15/00 |
| | | | | 175/24 |
| 8,606,734 | B2* | 12/2013 | Du Castel | G06N 7/005 |
| | | | | 706/45 |
| 8,676,721 | B2* | 3/2014 | Piovesan | G06Q 10/00 |
| | | | | 706/11 |
| 9,416,646 | B2* | 8/2016 | Du Castel | E21B 47/00 |
| 2003/0220742 | A1 | 11/2003 | Niedermayr et al. | |
| 2004/0124009 | A1* | 7/2004 | Hoteit | E21B 44/00 |
| | | | | 175/25 |
| 2009/0152005 | A1* | 6/2009 | Chapman | E21B 7/00 |
| | | | | 175/24 |
| 2009/0164125 | A1 | 6/2009 | Bordakov et al. | |
| 2009/0225630 | A1* | 9/2009 | Zheng | E21B 47/00 |
| | | | | 367/81 |
| 2010/0114493 | A1* | 5/2010 | Vestal | E21B 41/00 |
| | | | | 702/9 |

OTHER PUBLICATIONS

G. Thonhauser et al., "Use of Real-Time Rig Sensor Data to Improve Daily Drilling Reporting, Benchmarking and G. Planning—A Case Study," SPE Drilling & Completion, Sep. 2007, pp. 217-226.

Mathis, et al., "Automated Reporting Using Rig Sensor Data Enables Superior Drilling Project management (SPE 103211)" SPE Annual Technical Conference and Exhibition, Sep. 24-27, 2006, San Antonio Texas, USA, pp. 1-11.

Office Action for the equivalent Chinese patent application 201480018738.9 dated Jul. 11, 2017.

Office Action for the equivalent Chinese patent application 201480018738.9 dated Mar. 19, 2018.

Search Report for the equivalent European patent application 14773142.6 dated Jun. 3, 2016.

Communication pursuant to Article 94(3) for the equivalent European patent application 14773142.6 dated Jun. 22, 2016.

* cited by examiner

AUTOMATED RIG ACTIVITY REPORT GENERATION

FIELD OF THE INVENTION

Disclosed embodiments relate generally to systems and methods for operating a drilling rig and more particularly to a system and method for automatically generating rig activity reports.

BACKGROUND INFORMATION

Drilling operators and supervisors commonly report drilling rig activity in a variety of reporting formats and degrees of detail. The reports are often generated daily and include a log of the various rig activities such as drilling, reaming, tripping, and the like. These rig activity reports are commonly the primary record of events during well construction and may be important sources of information in further evaluating well performance and identifying non-productive time.

In present operations, the rig activity reports are generated manually (e.g., on a paper or computer log). Such manual report generation is time consuming and inefficient and may distract the rig operator and/or supervisor from more important and/or pressing activities. Moreover, the activity reports are generated after various activities have been completed (e.g., at the end of a shift) and are commonly based on human judgment and memory. Such human judgment and memory can be faulty and can therefore lead to an incomplete reporting of events or even a report containing errors.

SUMMARY

A method for automatically generating a drilling rig activity report while operating the rig is disclosed. The method includes receiving sensor measurements from a plurality of surface sensors deployed on the drilling rig. The sensor measurements may be made in real time while operating the rig and may be processed to compute rig state/activity information. The rig state(s) and a user defined report configuration may then be further processed to automatically generate the rig activity report.

The disclosed embodiments may provide various technical advantages. For example, the disclosed embodiments provide a system and method for automatically generating drilling rig activity reports. Automatic generation of such reports may advantageously improve reporting quality and efficiency as the rig reports are based on surface sensor data obtain in real-time while operating the rig. Moreover, the rig reports may be generated without any involvement from rig personnel thereby freeing such personnel to perform other essential activities. The generated rig activity reports may further include substantially any suitable level of detail with or without supporting sensor data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
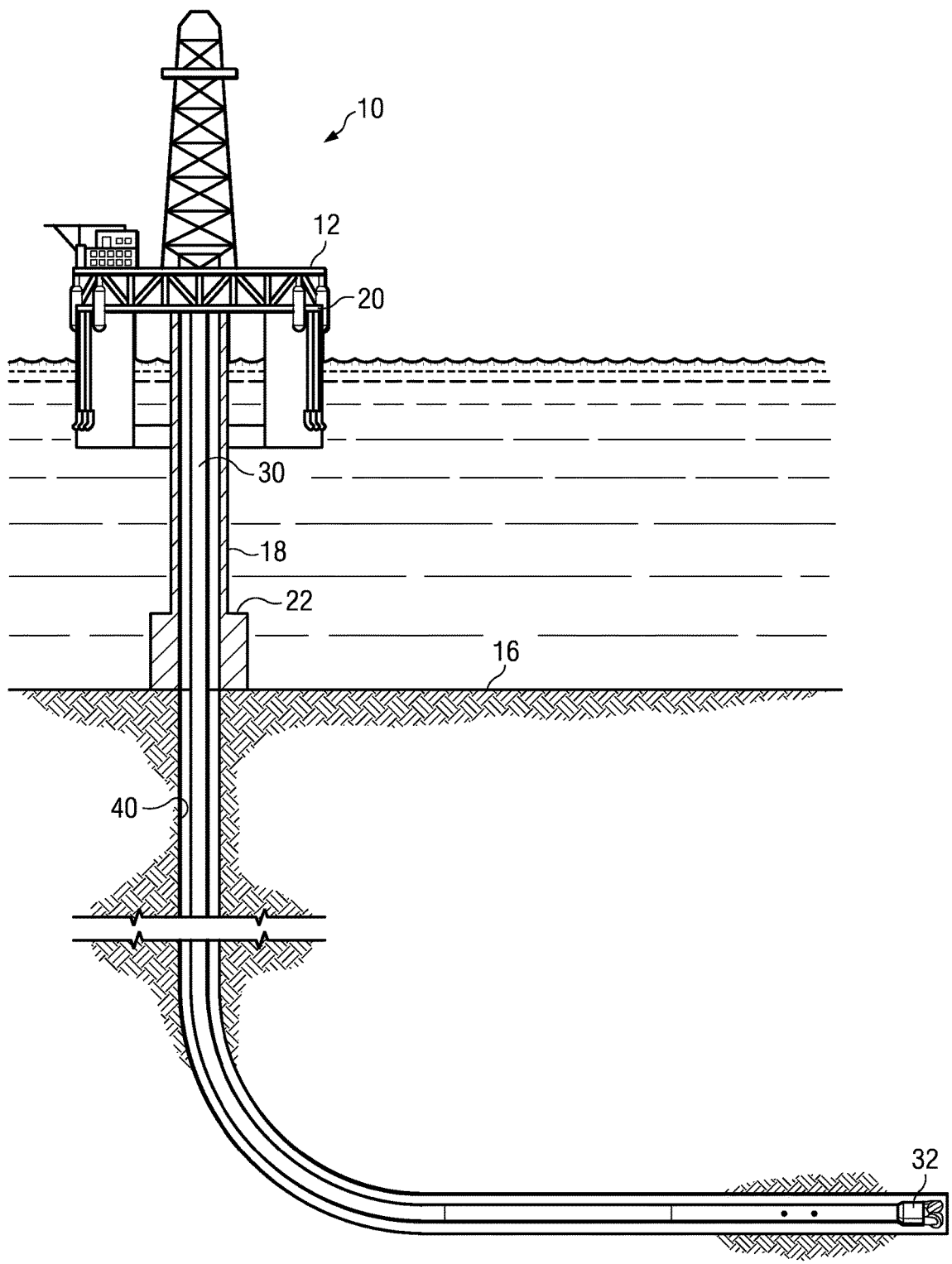
FIG. 1 depicts an example drilling rig on which disclosed embodiments may be utilized.

FIG. 1 depicts a drilling rig 10 suitable for using various method and system embodiments disclosed herein. A semi-submersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40. The derrick and hoisting apparatus may also be used to raise and lower a completion string, a casing string, a coiled tubing string, and the like. While FIG. 1 depicts a drilling operation (in that a drill string 30 is deployed in the borehole) it will be understood that the method and system embodiments disclosed herein may be used to automatically report rig activities from the initiation of drilling to completion of the well (including drilling, reaming, testing, casing, and various completion activities).

While not depicted the drilling rig may include a rotary table or a top drive for rotating the drill string 30 (or other components) in the borehole. The drilling rig may further include a swivel that enables the string to rotate while maintaining a fluid tight seal between the interior and exterior of the pipe. During drilling operations mud pumps draw drilling fluid ("mud") from a tank or pit and pump the mud through the interior of the drill string to the drill bit 32 where it lubricates and cools the bit and carries cuttings to the surface. Such equipment is well known to those of ordinary skill in the art and need not be discussed in further detail herein The drilling rig may also include various surface sensors (not illustrated on FIG. 1) for measuring and/or monitoring rig activities. These sensors may include, for example, (i) a hook load sensor for measuring the weight (i.e., the load) of the string on the hoisting apparatus, (ii) a block position sensor for measuring the vertical position of the travelling block (or the top of the pipe stand) in the rig as various components are raised and lowered in the borehole, (iii) a drilling fluid pressure sensor for measuring the pressure of drilling fluid pumped downhole, and (iv) a torque sensor for measuring the torque applied by the top drive or rotary table. Such surface sensors are also well known in the industry and need not be discussed in detail.

The drilling rig 10 may further optionally include downhole sensors, for example, including wireline logging sensors, logging while drilling sensors, measurement while drilling sensors, formation fluid sampling sensors, and the like. Downhole sensor data may be transmitted to the surface for real-time analysis or stored in downhole memory for future analysis.

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore.

Figure 2:
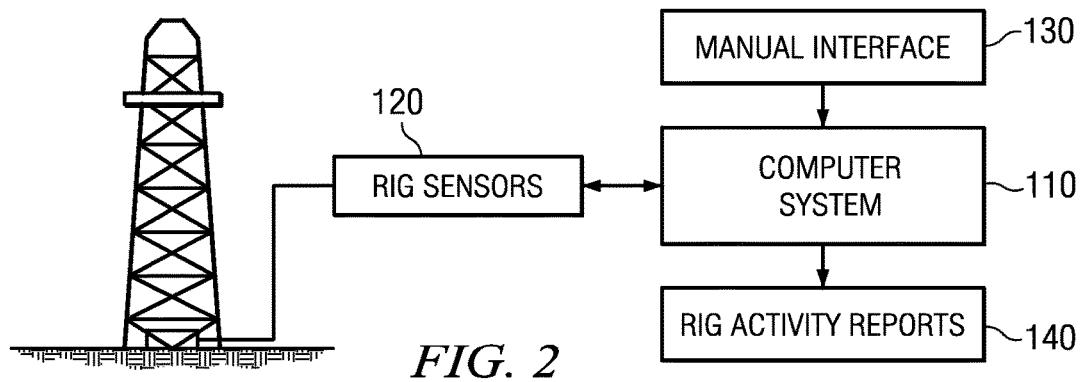
FIG. 2 depicts one disclosed embodiment of a system for automatically generating rig activity reports.

FIG. 2 depicts one disclosed embodiment of a system 100 for generating an automatic rig activity report. The system may be implemented at the rig site, for example, on a local computer system 110. The system may include a plurality of rig sensors 120, such as the surface sensors referred to with respect to FIG. 1, for obtaining measurements pertaining to the rig activity. The rig sensors may also include downhole sensors such as wirelines logging sensors, LWD sensors, MWD sensors, formation fluid sensors, and the like. The rig sensors may be in electronic communication with the computer system 110 such that the sensor measurements may be transferred to the computer system where they may be used to calculate various parameters relevant to construction (e.g., drilling, casing, and completing) the wellbore. Such calculated parameters may include, without limitation, rig states, drilling states, rig activity, wellbore geodetic trajectory, formation characteristics, fluid pressures, rate of penetration of the drill bit, and characteristic of mechanical interaction between downhole equipment and the wellbore through the formations as the wellbore is drilled. Collectively, the measurements and computed parameters may be used to automatically compute an ongoing rig activity operated in a certain phase of the well construction at any point in time.

The system 100 may further include a manual interface 130 that enables additional information to be input into the computer system 110. For example, information not readily attainable via the aforementioned sensor measurements may be manually input via a keyboard or other similar user interface. Such information may include various physical dimensions, manual measurements, and substantially any other rig information not available from the sensors deployed at the rig. The manual interface 130 may also enable a rig operator (or other personnel) to input or change a user defined configuration (or configurations) for the activity reports which are to be generated automatically. The computer system 110 is configured to process data from the sensors as well as the user inputs to automatically generate the rig reports 140.

It will be understood that system 100 is not necessarily located entirely at the rig site. For example, the computer system 110 and/or the manual interface 130 may be located offsite and may communicate with the rig sensors 110 via substantially any known means (e.g., wirelessly or via internet or intranet communication channels). The disclosed embodiments are not limited in these regards. Nor are they limited to any particular hardware implementation of the system 100.

Figure 3:
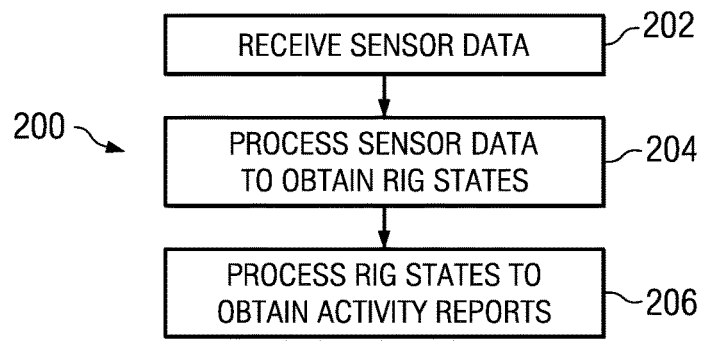
FIG. 3 depicts a flow chart of one disclosed method embodiment for automatically generating a rig activity report.

FIG. 3 depicts a flow chart of one disclosed method embodiment 200 for automatically generating a rig activity report. Sensor data is received at 202. The sensor data may include data from the aforementioned rig sensors (e.g., from a hook load sensor, a block position sensor, a drilling fluid pressure sensor, and/or a top drive or rotary table torque sensor). The sensor data may also include depth sensor measurements and/or drilling fluid flow-in sensor measurements. The sensor data may still further include MWD data, LWD data, wireline data, and the like. In general the sensor measurements are made continuously (e.g., while operating the rig) and transmitted to a computer processor. Continuous sensor measurements may be made at substantially any suitable time interval (e.g., at 10 millisecond, one second, or one minute intervals).

The sensor data is processed at 204 to obtain a rig state (or rig state as a function of time). The rig state describes the state of operation of the drilling rig (the rig activity) at any particular time, for example, the rig may be rotary drilling, slide drilling, tripping out, tripping in, rotating, circulating, idle, etc. These are particular rig states. The rig state may also be referred to herein as a rig activity (i.e., the primary activity of the rig at any particular time). Table 1 illustrates example rig states (or rig activities) that may be obtained from binary measurements (on/off or yes/no) from the aforementioned sensors. It will be understood that additional states may also be obtained using sensor values rather than simple binary measurements or measurements from additional surface and/or downhole sensors.

TABLE 1

| Rig State | Axial Motion (velocity) | Hook Load (in slips) | Rotation (torque) | Pumping (SP pressure) | On Bottom |
|---|---|---|---|---|---|
| Rotary Drill | Down | No | Yes | Yes | Yes |
| Slide Drill | Down | No | No | Yes | Yes |
| In Slips | None | Yes | No | Yes/No | No |
| Ream | Down | No | Yes | Yes | No |
| Run in, Pump | Down | No | No | Yes | No |
| Run in, Rotate | Down | No | Yes | Yes | No |
| Run in | Down | No | No | No | No |
| Back Ream | Up | No | Yes | Yes | No |
| Pull up, Pump | Up | No | No | Yes | No |
| Pull up, Rotate | Up | No | Yes | No | No |
| Pull up | Up | No | No | No | No |
| Rotate, Pump | None | No | Yes | Yes | No |
| Pump | None | No | No | Yes | No |
| Rotate | None | No | Yes | No | No |
| Stationary | None | No | No | No | No |

At 206 the rig states (or rig state) may be processed in combination with a predetermined report configuration (e.g., a user input report configuration) to automatically generate a rig activity report. The report may be configured in substantially any suitable format. For example, the report may be generated in log format (also referred to herein as a micro activity report) including a sequential listing of each rig activity (or a listing of changes in rig state) and the duration of that activity or state. The rig activity report may alternatively and/or additionally include a summary of major activities (a macro activity report) based on predetermined aggregation parameters or a time based reporting format, for example, including an hourly or daily report.

Figure 4:
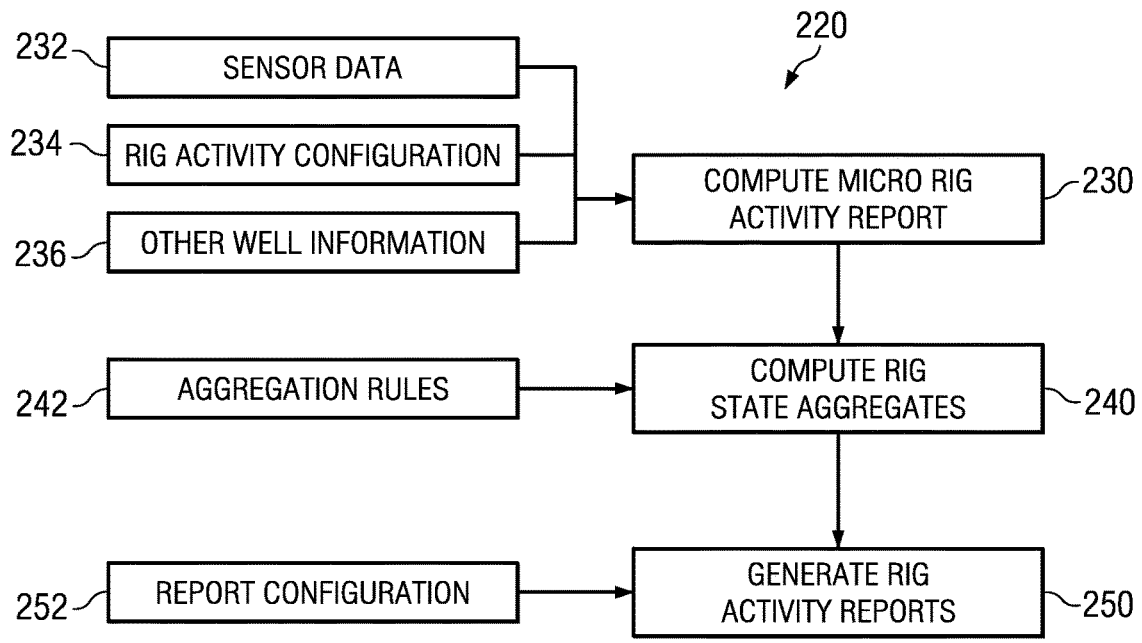
FIG. 4 depicts a flow chart of another disclosed method embodiment for automatically generating a rig activity report.

FIG. 4 depicts a flow chart of example method embodiment 220. Method embodiment 220 is similar to method embodiment 200 in that it involves processing sensor data to obtain rig states (or a micro rig activity report) and further processing the rig states and a user defined activity report configuration to automatically generate the rig activity report (or reports). At 230 a micro rig activity report is computed from high frequency rig sensor data 232, a predetermined or user-input rig activity configuration 234 including a rig activity definition, rig activity inputs, and a rig activity equation, and other rig and well information of interest 236. The micro rig activity report computed at 230 may be thought of as a high resolution temporal log of rig states. This log may include, for example, a listing of rig states with time. A small section of an example micro activity report may read as follows:

15:43 to 15:59 Back reaming from 4480 to 4455 meters.
15:59 to 16:08 Forward reaming from 4455 to 4480 meters.
16:08 to 16:15 String in slip at 4480 meters.
16:15 to 16:18 Pump and rotate at 4480 meters.

Each entry in the micro activity report may further include minimum, maximum, and/or average values of the various sensor measurements, for example, including rotation rate, torque, standpipe pressure, hook load, and mud flow-in.

At 240 the micro rig activity report is processed according to predetermined or user defined aggregation rules 242 so as to generate various rig state aggregates, for example, including hourly rig activity, daily rig activity, and macro rig activity reports. Substantially any suitable aggregation rules may be defined and utilized. For example, the aggregation rules may include one or more of the following: (i) certain activities (such as drilling ahead), when present, may always be listed in the macro report, (ii) any activity that exceeds a predetermined allotted total time period may always be listed in the macro report, (iii) the total time spent performing each activity in some predetermined time interval may be reported, e.g., as a listing of each activity and total time, and (iv) various predetermined activities may be clustered into more general categories with a listing of each general category (e.g., all activities associated with making and breaking connections may be grouped together). For example, the aforementioned section of an example micro activity report may be summarized as follows:

15:43 to 16:17 making connection while drilling at 4480 meters.

The rig state aggregates may be further processed to generate one or more activity reports at 250, for example, based on user defined report configuration(s) 252. The report configurations may include, for example, a reporting language, report contents, report format, report resolution, and the like. The report configurations may further include standard IADC reports such as hourly reports and morning reports that report total time performing various predefined activities (as well as average values of the aforementioned sensor data). When drilling an hourly or daily report may include, for example, total time spent drilling, reaming, making/breaking connection, and in-slip as well as a beginning and ending depth when drilling. When tripping (in or out) an hourly or daily report may include, for example, total time making/breaking connection and lifting or lowering the string as well as minimum, maximum, and/or average rates of lifting or lowering the string.

While the preceding examples relate generally to drilling activities, it will be understood that the disclosed embodiments are not so limited, but may rather applied to substantially all rig activities including drilling, casing, and completion activities.

Although automated rig activity report generation and certain advantages thereof have been described in detail, it should be understood that various changes, substitutions and alterations may be made herein without departing from the spirit and scope of the disclosure as defined by the appended claims.

What is claimed is:

1. A method for automatically generating a rig activity report, the method comprising:
    (a) receiving sensor measurements from a plurality of surface sensors deployed on a drilling rig;
    (b) processing the sensor measurements received in (a) to compute a plurality of rig states;
    (c) computing a high resolution temporal listing of the rig states;
    (d) calculating a rig state aggregate of the rig states from the high resolution temporal listing of the rig states by applying user defined aggregation rules, wherein calculating the rig state aggregate comprises:
    identifying activities in the high resolution temporal listing of the rig states;
    determining that the identified activities are members of a category of activities specified in the user defined aggregation rules; and
    clustering the identified activities into the rig state aggregate based on the user defined aggregation rules, wherein the rig state aggregate represents a relationship between the identified activities in the high resolution temporal listing; and
    (e) generating an activity report based on the rig state aggregate of the rig states and a user defined report configuration.

2. The method of claim 1, wherein:
the sensor measurements are received continuously in (a);
the sensor measurements are processed in (b) to compute the listing of the rig states as a function of time; and
the listing of the rig states and the user defined report configuration are processed automatically in (c) to automatically generate a temporal listing rig activity report.

3. The method of claim 1, wherein the surface sensors comprise a hook load sensor, a block position sensor, a drilling fluid pressure sensor, and a top drive or rotary table torque sensor.

4. The method of claim 1, wherein (a) further comprises receiving sensor measurements from one or more downhole sensors.

5. The method of claim 1, wherein the rig activity report is an hourly report or a daily report.

6. The method of claim 1, wherein the rig state comprises at least one of rotary drilling, slide drilling, in-slips, reaming, back reaming, running in, running in with circulation, running in with rotation, pulling up, pulling up with circulation, pulling up with rotation, pumping, rotating, pumping and rotating, or stationary.

7. The method of claim 1, wherein the rig state is selected from the group consisting of: rotary drilling, slide drilling, in-slips, reaming, back reaming, running in, running in with circulation, running in with rotation, pulling up, pulling up with circulation, pulling up with rotation, pumping, rotating, pumping and rotating, and stationary.

8. The method of claim 1, wherein calculating the rig state aggregate further comprises:
    determining that an activity took place for a duration based on the high resolution temporal listing of the rig states;
    determining that the duration exceeds a predetermined allotted time period specified in the user defined aggregation rules; and
    in response to determining that the duration exceeds the predetermined allotted time period specified in the user defined aggregation rules, including the activity in the rig state aggregate.

9. The method of claim 1, wherein calculating the rig state aggregate further comprises:
    determining that an activity that took place based on the high resolution temporal listing of the rig states;
    determining that the activity is one of a plurality of activities listed in the user defined aggregation rules; and
    in response to determining that the activity is one of the plurality of activities listed, including the activity in the rig state aggregate.

10. The method of claim 1, wherein calculating the rig state aggregate further comprises:
- computing a total time performing an activity in predetermined time period;
- determining that the total time performing the activity in the predetermined time period is greater than a threshold time specified by the user defined aggregation rules; and
- in response to determining that the total time perform the activity in the predetermined time period is greater than the threshold time, including the activity in the rig state aggregate.

11. A system for automatically generating a rig activity report, the system comprising:
- a plurality of surface sensors deployed on a drilling rig; and
- a computer processor in electronic communication with the surface sensors, the processor configured to automatically:
    - (a) receive sensor measurements from the surface sensors;
    - (b) compute rig states from the received sensor measurements;
    - (c) compute a high resolution temporal listing of the rig states from the received sensor measurements;
    - (d) calculate a rig state listing of the rig states from the high resolution temporal listing of the rig states and user defined aggregation rules, wherein calculating the rig state aggregate comprises:
        - identifying activities in the high resolution temporal listing of the rig states;
        - determining that the identified activities are members of a category of activities specified in the user defined aggregation rules; and
        - clustering the identified activities into the rig state aggregate based on the user defined aggregation rules, wherein the rig state aggregate represents a relationship between the identified activities in the high resolution temporal listing; and
    - (e) generate an activity report based on the rig state aggregate of the rig states and a user defined report configuration.

* * * * *